(12) United States Patent
Zelek

(10) Patent No.: US 8,770,632 B2
(45) Date of Patent: Jul. 8, 2014

(54) BAYONET CONNECTION FOR BURNER TUBE

(75) Inventor: Leonard Zelek, Chicago, IL (US)

(73) Assignee: Weber-Stephen Products Co., Palatine, IL (US)

( * ) Notice: Subject to any disclaimer, the term of this patent is extended or adjusted under 35 U.S.C. 154(b) by 1232 days.

(21) Appl. No.: 11/502,075

(22) Filed: Aug. 10, 2006

(65) Prior Publication Data

US 2008/0048449 A1 Feb. 28, 2008

(51) Int. Cl.
*F16L 19/00* (2006.01)

(52) U.S. Cl.
USPC .......................................... 285/401; 285/305

(58) Field of Classification Search
USPC ................. 285/305, 376, 401, 308, 315–317; 126/512, 100, 116 R, 25 B, 39 R, 39 E, 126/41 R; 403/348, 383; 74/526–527
See application file for complete search history.

(56) References Cited

U.S. PATENT DOCUMENTS

| | | | | |
|---|---|---|---|---|
| 1,513,710 A | * | 10/1924 | Lewis | 24/676 |
| 2,092,116 A | * | 9/1937 | Hansen | 285/277 |
| 2,099,335 A | * | 11/1937 | Hansen | 251/149.6 |
| 2,344,740 A | * | 3/1944 | Shaff | 285/277 |
| 2,708,589 A | * | 5/1955 | Masek | 285/277 |
| 2,726,848 A | * | 12/1955 | Montgomery et al. | 175/321 |
| 2,777,716 A | * | 1/1957 | Gray | 285/276 |
| 2,805,089 A | * | 9/1957 | Hansen | 285/317 |
| 3,666,300 A | * | 5/1972 | Russell | 285/316 |
| 3,964,463 A | * | 6/1976 | Dailey | 126/41 R |
| 4,422,435 A | | 12/1983 | Spell | |
| 4,613,112 A | * | 9/1986 | Phlipot et al. | 251/149.6 |
| 4,686,957 A | * | 8/1987 | Koziol | 126/41 R |
| 4,762,530 A | * | 8/1988 | Koziol | 48/180.1 |
| 4,878,477 A | * | 11/1989 | McLane | 126/41 R |
| 4,922,887 A | * | 5/1990 | Foxford | 126/41 R |
| 5,213,075 A | * | 5/1993 | Stephen et al. | 126/25 B |
| 6,067,978 A | | 5/2000 | Schlosser et al. | |
| 6,244,263 B1 | | 6/2001 | Schlosser et al. | |

FOREIGN PATENT DOCUMENTS

| | | |
|---|---|---|
| CA | 2518212 | 9/2004 |
| GB | 2093547 | 9/1982 |

* cited by examiner

*Primary Examiner* — Daniel P Stodola
*Assistant Examiner* — Fannie Kee
(74) *Attorney, Agent, or Firm* — David I. Roche; Baker & McKenzie LLP

(57) ABSTRACT

A quick-connect fitting for connecting a burner tube to a barbecue grill. The quick-connect includes a female connector and a male connector. In one embodiment, the female connector is attached to the burner tube and the male connector is connected upstream of the fuel supply. The female connector has an inwardly directed protrusion while the male connector has a corresponding longitudinal entry portion and circumferential groove. In the first step of assembly, the female connector is mated with the male connector by aligning the protrusion with the entry portion and urging the connectors together. In the second step of assembly, the female connector is rotated relative to the male connector such that the protrusion enters the groove to effectively prevent relative axial movement between the connectors.

4 Claims, 3 Drawing Sheets

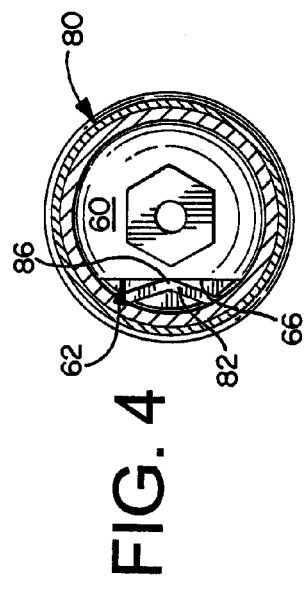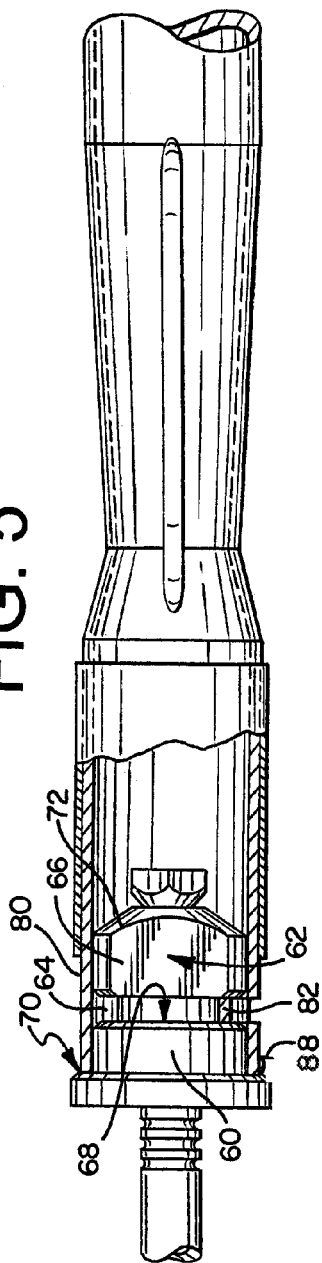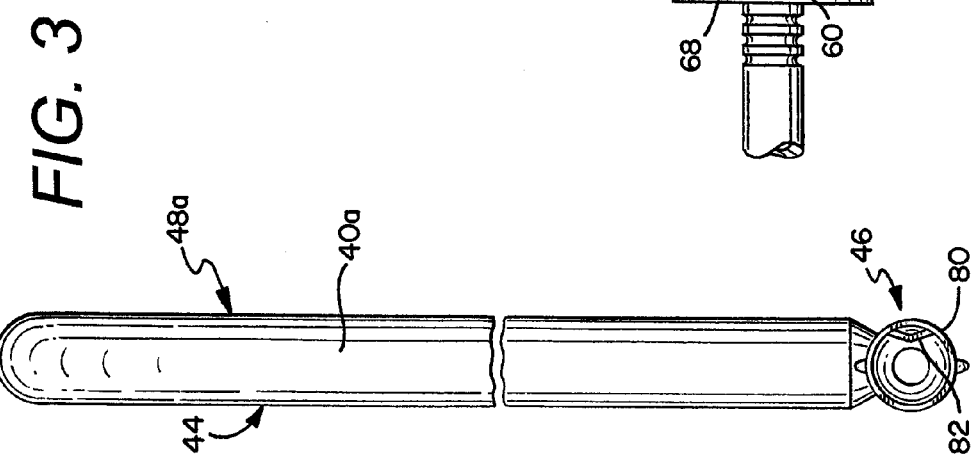

BAYONET CONNECTION FOR BURNER TUBE

BACKGROUND AND SUMMARY OF THE INVENTIONS

The inventions described and claimed herein relate generally to gas burner tubes for barbecue grills. More specifically, the inventions relate to quick-connects for connecting a barbecue grill burner tube downstream from a gas supply. In particular, the preferred embodiment of the quick-connect can be characterized as an improved version of a bayonet connection which is less expensive to manufacture than traditional bayonet connections and allows easier, faster, and more efficient installation of a gas burner tube in a barbecue grill.

The preferred embodiment of the present inventions is comprised generally of a female connector and a male connector which are adapted to mate. The female connector and the male connector are preferably cylindrical to allow one to be rotated relative to the other when in mating configuration. The male connector is preferably integral with the gas supply control valve (i.e. typically formed or attached to the downstream distal end of a gas supply tube) and the female connector is preferably integral with the burner tube (i.e. typically formed or attached to the upstream distal end of the burner tube). It is contemplated, however, that the male connector could be integral with the burner tube and the female connector could be integral with the gas supply control valve.

The female connector is preferably cylindrical and preferably has an inwardly directed protrusion which is adapted to engage with the male connector and to lock the female connector to the male connector. The protrusion can be formed by any means known in the art; but is preferably formed by punching the wall of the female connector to form an inwardly directed bridge. The male connector comprises an entry portion and a groove. The entry portion is preferably adapted to allow the male connector to mate with the female connector and is characterized as a pathway for receiving the protrusion into the groove. The entry portion is preferably longitudinally aligned but could be both circumferentially and longitudinally aligned (i.e. spiral). The groove is preferably aligned circumferentially and extends for at least a portion of the circumference of the male connector, although the groove preferably extends for the entire circumference of the male connector. As an alternative, the groove could be characterized as a detent. Even further, the groove could terminate in a detent. When the female connector is rotated relative to the male connector while in mating engagement, the groove receives the protrusion which effectively prevents the female connector from moving axially relative to the male connector. A tight fit is preferable, although there may be some play in the connection. It is contemplated that instead of the aforementioned configuration, the male connector could comprise an outwardly directed protrusion and the female connector could comprise the entry portion and groove.

The preferred embodiment of the present inventions is characterized by a simple two move assembly; i.e., the preferred embodiment of the quick-connect fitting provides a means for installing burner tubes in a barbecue grill with two simple steps, reducing the time and cost of assembling a barbecue grill. In the first step, the burner tube is placed into assembly orientation and pushed axially such that the female connector and male connector are urged into mating engagement. In the assembly orientation, the protrusion on the female connector is aligned with the entry portion on the male connector, such that the female connector can receive the male connector. In the second step, the female connector is rotated into working orientation, wherein the protrusion is received into the groove, effectively preventing the female connector from axially disengaging the male connector. In the working orientation, the orifices on the burner tube are properly aligned for operation, preferably in the upward direction.

BRIEF DESCRIPTION OF THE DRAWINGS

These and other features, aspects, objects, and advantages of the inventions described and claimed herein will become better understood upon consideration of the following detailed description, appended claims, and accompanying drawings where:

FIG. 3 is a right side view of a burner tube (in the assembly orientation) which is integral with a preferred embodiment of the female connector;

FIG. 4 is a left side view of a preferred embodiment of the male connector; and

FIG. 5 is a rear partial sectional view of a preferred embodiment of the burner tube quick-connect with a burner tube in working orientation.

Figure 1:
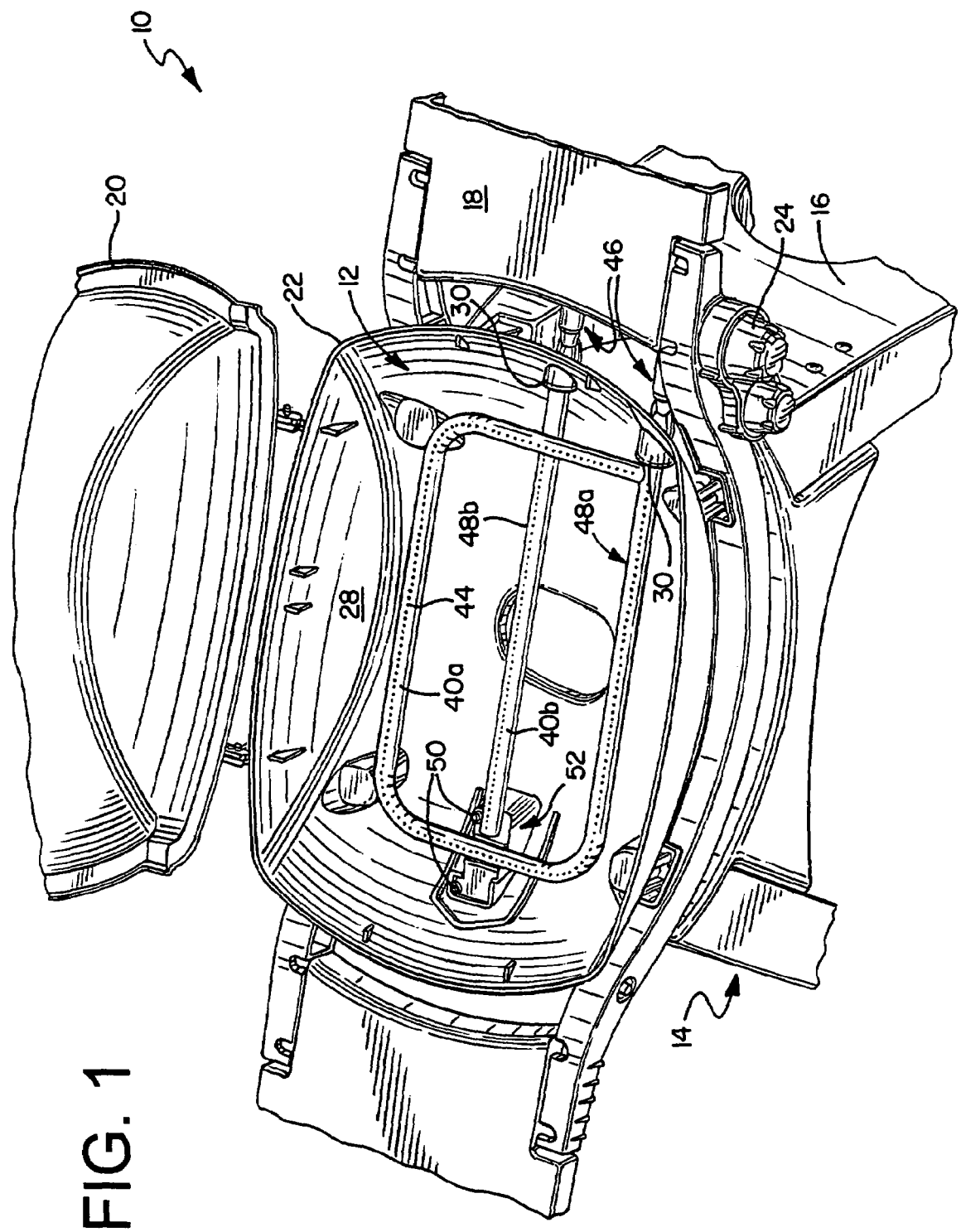
FIG. 1 is a perspective view of an exemplary barbecue grill with a preferred embodiment of the burner tube quick-connect.

It should be understood that the drawings are not necessarily to scale and that the embodiments are sometimes illustrated by graphic symbols, phantom lines, diagrammatic representations and fragmentary views. In certain instances, details which are not necessary for an understanding of the inventions described and claimed herein or which render other details difficult to perceive may have been omitted. It should be understood, of course, that the inventions described herein are not necessarily limited to the particular embodiments illustrated herein.

Like reference numerals will be used to refer to like or similar parts from Figure to Figure in the following description of the drawings.

DETAILED DESCRIPTION OF THE DRAWINGS

Several of the figures attached hereto and the description below depict and/or discuss the connections of the present invention with reference to a P-shaped tube 40a. Nevertheless, it is contemplated that the connection (or quick-connect fitting) of the present invention could be used with a straight tube 40b or any other shaped tube (not shown).

Referring first to FIG. 1, a barbecue grill 10 is depicted which includes a preferred embodiment of the present invention. The barbecue grill 10 is generally comprised of a cooking chamber 12 and a frame 14. In the particular style of grill shown in FIG. 1, the frame 14 has side shelves 18 and is adapted to engage with a grill cart 16. The cooking chamber 12 as shown is comprised of a lower member 22 and an upper member 20, the upper member 20 being typically hingedly connected to the lower member 22. The present inventions are preferably directed to gas barbecue grills 10, which are typically fueled by either natural gas or liquefied propane gas ("LPG").

Fuel is typically directed to the cooking chamber 12 through a series of tubes 26, valves 24, and regulators (not shown). The fuel is ultimately directed through these components to a gas burner tube 40a, 40b which is housed in the cooking chamber 12, but often extends through an opening 30 in the wall 28 of the lower member 22 to an exterior of the cooking chamber 12. It is at this point that the burner tube 40a, 40b is connected to a fuel supply tube 26.

The burner tubes 40a and 40b, having a plurality of orifices or ports 44, serve to distribute the fuel source in a generally even manner in the cooking chamber. As shown in FIG. 1, when the burner tubes are installed properly, the orifices 44 are preferably upwardly directed, although the orifices 44 are not required to be directed as such.

There are two general shapes of burner tubes 40a, 40b which are discussed herein with reference to the present invention. However, it is contemplated that the present invention can be utilized with other shapes of burner tubes. The first is a "P" shaped burner tube 40a ("P-tube") and the second is a straight burner tube 40b ("straight tube"). Both the P-tube 40a and the straight tube 40b have first portions 46 and second portions 48a, 48b. The first portions 46 are adapted to extend through an opening 30 in the wall 28 of the lower member 22, for connecting to the fuel supply lines. The second portions 48a, 48b are provided with orifices 44 from which flames emanate when the fuel source is ignited. The second portion 48a of the P-tube 40a is characterized as a loop while the second portion 48b of the straight tube 40b is straight. The burner tubes 40a, 40b, as depicted, each include a bracket 50 which extends from the second portion 48a, 48b for securing the burner tubes 40a, 40b, to the lower member 22.

Figure 2:
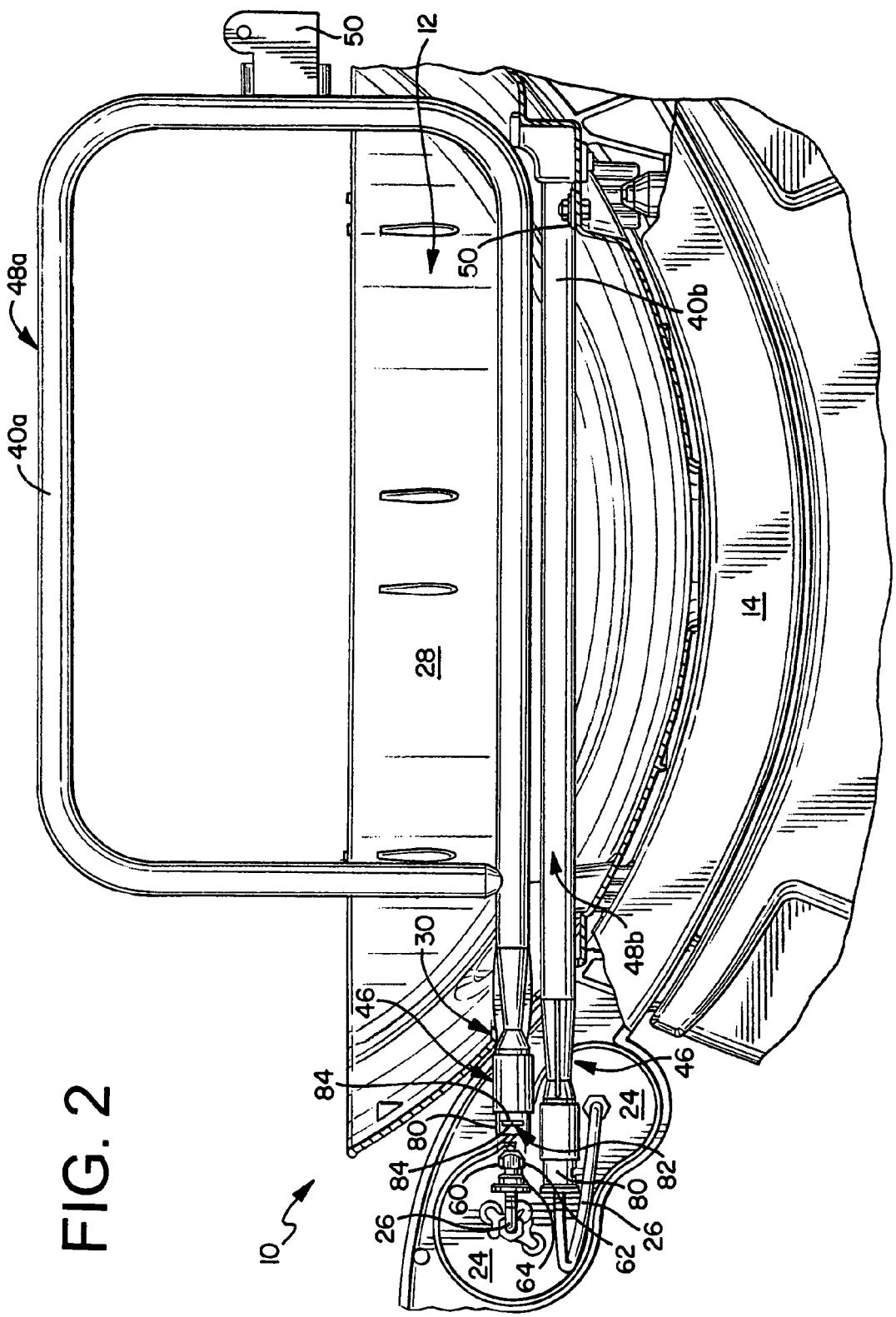
FIG. 2 is a rear partial sectional view of a preferred embodiment of the burner tube quick-connect with one burner tube in assembly orientation prior to mating engagement of the female connector with the male connector and another burner tube in working orientation.

With reference to FIG. 2, the connection of the present invention generally comprises a male connector 60 and a female connector 80. In this Figure, both a P-tube 40a and a straight tube 40b are depicted, both of which have a female connector 80. However, the P-tube 40a is depicted in assembly orientation whereas the straight tube 40b is depicted in working orientation.

For both of the tubes 40a, 40b, the corresponding male connector 60 is connected to a tube 26 downstream of the control valve 24 and the female connector 80 is integral with the burner tube 40a, 40b and forms a part of the first portion 46 of the tube 40a. When installed on the grill 10, the male connector 60 is preferably aligned with an opening 30 in a side wall 28 of the lower member 22. It is contemplated that the female connector 80 could be an independent component that is attached to the burner tube 40a, 40b by any appropriate fastening means or could be formed into a distal end of the burner tube 40a, 40b. Also, as discussed above, it is contemplated that the female connector 80 could be connected to the supply tubing 26 and the male connector could be connected to the burner tube 40a.

As better shown in FIG. 3, the female connector 80 is preferably comprised of a tubular member having an inwardly directed protrusion 82 The protrusion 82 can be formed by any means known in the art, such as by welding a protrusion 82 to the inside of the female connector 80. However, the protrusion 82 is preferably mechanically formed into the female connector 80 by a punching means. In this manner, an inwardly directed, chordal bridge is formed, as depicted. The protrusion 82 is preferably circumferential in orientation and is formed by two circumferential slits 84. During the forming process, the material between the two slits 84 is preferably forced inwardly into a triangular shape, wherein the apex 86 of the protrusion 82 is adapted to project into the groove 64 of the male connector 60 when the burner tube is in the working orientation. The apex 86 of the protrusion 82 is also dimensioned such that it can be received into the entry portion 62 of the male connector 60, as best shown in FIG. 4.

The male connector 60 is comprised of a generally cylindrical body, wherein an entry portion 62 and a groove 64 are formed into the generally cylindrical body. It is contemplated that under certain conditions, the male connector 60 may not be visible to the assembler during installation of the burner tube 40a. Consequently, the male connector 60 preferably comprises a chamfered leading edge 72 to facilitate the blind alignment of the female connector 80 with the male connector 60. It is believed that the chamfered front edge will further reduce the time required to assemble the grill 10.

The entry portion 62 of the male connector 60 can be characterized as a flat surface 66 which is formed along a chord line. Alternatively, the entry portion 62 can be embodied as a channel. The entry portion 62 is generally axially oriented to allow the female connector 80 to mate with the male connector 60. The entry portion 62 of the male connector 60 is interconnected with and preferably terminates at the groove 64 such that the protrusion 82 of the female connector 80 can be received by the groove 64 when the female connector 80 and the male connector 60 are in mating configuration, as is best shown in FIG. 5.

The groove 64 is preferably characterized as a circumferential channel. The groove 64 preferably extends for the entire circumference of the male connector 60, although it is contemplated that the groove 64 can extend for only a portion of the circumference of the male connector 60. Given the nature of the groove 64, the entry portion 62 preferably terminates at a wall 68, such that when the female connector 80 is matingly engaged with the male connector 60 (i.e., pushed axially toward the male connector 60), the wall 68 defines a stop for the protrusion 82 of the female connector 60. When the protrusion 82 contacts the stop, axial movement of the female connector 60 is stopped and the protrusion 82 is appropriately aligned with the groove 64. At this point, the female connector 80 (or the burner tube 40a, 40b) is twisted or rotated such that the protrusion 82 is received into the groove 64, as depicted in FIG. 5. As an alternative or in combination with the wall 68, an additional stop can be formed by a second wall 70 which is adapted to contact a distal end 88 of the female connector 80 when the protrusion 82 is aligned with the groove 64.

Referring again to FIG. 2, the P-tube 40a is shown in the assembly orientation wherein the female connector 80 is aligned for axial engagement with the male connector 60. That is, the protrusion 82 is circumferentially aligned with the entry portion 62. In the assembly orientation, the loop of the P-tube 40a is preferably vertically oriented, which facilitates insertion of the first portion 46 of the burner tube 40a into the opening 30 in the wall 28 of the lower member 22. The orientation of the P-tube in the assembly orientation is dependent upon the relative location of the protrusion 82 to the burner tube orifices 44 and the relative location of the entry portion 62 to horizontal. As depicted, the entry portion 62 is horizontally aligned and is directed towards the back of the grill (referenced herein as the 270° position) whereas the protrusion 82 is offset from the burner tube orifices 44 by 180°. As such, when the burner tube 40a is in the assembly orientation, the protrusion 82 is positioned at 270° (in alignment with the entry portion 62) while the orifices are pointed towards the 90° position (towards the front of the grill).

Turning now to FIG. 1, the burner tube 40a, 40b is shown in the working orientation wherein the female connector 80 is locked into engagement with the male connector 60; i.e., the female connector 80 cannot be moved axially relative to the male connector 60. This positive connection between the connectors 60, 80 is enabled by engagement between the protrusion 82 and the groove 64, as is better shown in FIG. 5.

To reach this position, the burner tube 40*a* is first moved into mating engagement with the male connector 60 such that the protrusion 82 is aligned with the groove 64. Then, the burner tube 40*a* is rotated relative to the male connector 60 such that the protrusion 82 enters the groove 84. In the configuration depicted in the Figures, the burner tube is rotated 90° counterclockwise (i.e., when facing the leading edge 72 of the male connector 60). As such, in the working condition, the orifices 44 are preferably directed towards the 0° position and the protrusion 82 is preferably positioned at 180°. Note that the assembly and working positions of the protrusion 82 and the orifices 44 depend upon the chosen orientation of the entry portion 62 of the male connector 60 and the relative angle between the protrusion 82 and the orifices 44; i.e., the assembly and working positions of the protrusion 82 and the orifices 44 can infinitely vary. Consequently, the angles described herein are included for example purposes and are not intended to limit the breadth of the claims in any manner.

When the burner tube 40*a* is rotated into the working orientation, the orifices 44 are preferably upwardly directed for proper operation of the grill 10. Furthermore, the quick-connect fitting (i.e. the male and female connectors 60, 80) serve to secure the burner tube 40*a* to the grill 10 at the first portion 46 of the burner tube 40*a*. To more securely attach the burner tube 40*a* to the grill, the burner tube 40*a* is preferably provided with a bracket 50 for attaching to the lower member 22, as shown in FIG. 1. The bracket 50 can be attached directly or indirectly to the lower member 22 by any means known in the art. In the preferred embodiment, the lower member is provided with a mount 52 which is adapted to align with the bracket 50 when the burner tube 40*a* is rotated into the working orientation. The bracket 50 is preferably attached to the mount 52 by bolting means.

Although the inventions described and claimed herein have been described in considerable detail with reference to certain preferred embodiments, one skilled in the art will appreciate that the inventions described and claimed herein can be practiced by other than the preferred embodiments, which have been presented for purposes of illustration and not of limitation. Therefore, the spirit and scope of the appended claims should not be limited to the description of the preferred embodiments contained herein.

I claim:

1. A quick-connect fitting comprising:
   a female connector and a male connector, wherein the female connector and the male connector lock together to form a gas-tight seal wherein the inside of the male connector is in fluidic communication with the inside of the female connector;
   the female connector comprising a substantially tubular body having an inwardly directed protrusion comprising an integral part of the substantially tubular body, wherein the protrusion is substantially rigid and is axially spaced from an end of the tubular body;
   the male connector being generally cylindrical and having an entry portion and a groove, the entry portion comprising a substantially flat surface, the flat surface being formed substantially along a chord line between two points of the generally cylindrical male connector, wherein the maximum distance from the substantially flat surface to a diametrically opposite surface of the generally cylindrical male connector is less than the overall diameter of the male connector, to allow engagement of the female connector with the male connector when the protrusion is aligned with the entry portion; and,
   the groove extending for at least a portion of a circumference of the male connector, the groove locking the female connector to the male connector upon rotation that causes the protrusion to move past the entry portion and engage the groove;
   the female connector and male connector comprising a sliding fit when the protrusion is aligned with the entry portion and an interference fit that locks the female and male connectors together when the protrusion is rotated into the groove.

2. The quick-connect fitting of claim 1 wherein the male connector comprises a first stop and a second stop which are adapted to stop the female connector during axial engagement when the protrusion is aligned with the groove, the first stop engaging with a distal end of the female connector and the second stop engaging with the protrusion.

3. The quick-connect fitting of claim 1 wherein an outer diameter of the male connector at the entry portion generally corresponds to an inner diameter of the female connector at the protrusion to allow axial engagement of the female connector with the male connector when the protrusion is aligned with the entry portion.

4. The quick-connect fitting of claim 1 wherein the protrusion is generally v-shaped.

* * * * *